(No Model.)

P. H. GRIMM.
SUGAR CUTTER.

No. 438,412.  Patented Oct. 14, 1890.

Witnesses:

Inventor:—
Paul H. Grimm
by attorneys
Brown & Seward

UNITED STATES PATENT OFFICE.

PAUL H. GRIMM, OF GLEN COVE, NEW YORK, ASSIGNOR TO THE DURYEA'S BROTHERS, OF SAME PLACE.

SUGAR-CUTTER.

SPECIFICATION forming part of Letters Patent No. 438,412, dated October 14, 1890.

Application filed July 3, 1890. Serial No. 357,694. (No model.)

*To all whom it may concern:*

Be it known that I, PAUL H. GRIMM, of Glen Cove, in the county of Queens and State of New York, have invented a certain new and useful Improvement in Sugar - Cutters, of which the following is a specification.

My invention relates to an improvement in sugar-cutters, and particularly to cutters adapted to subdivide masses of what is commercially known as "glucose" or "grape" sugar, for the purpose of packing it in bags or sacks for shipment or for any other desirable practical purpose. It is found convenient in practice to discharge the boiled sugar into barrels, where it congeals into a dense hard mass. Purchasers, particularly the foreign trade, do not care to receive the sugar in the form of the hard mass in the barrel, but demand that it be cut or crushed and shipped in a bag or sack. To meet this demand, and at the same time to retain the use of the barrel as the most convenient and inexpensive form of mold for receiving the sugar in its liquid state, I have devised a cutter, a practical embodiment of which is represented in the accompanying drawings, in which—

Figure 3:
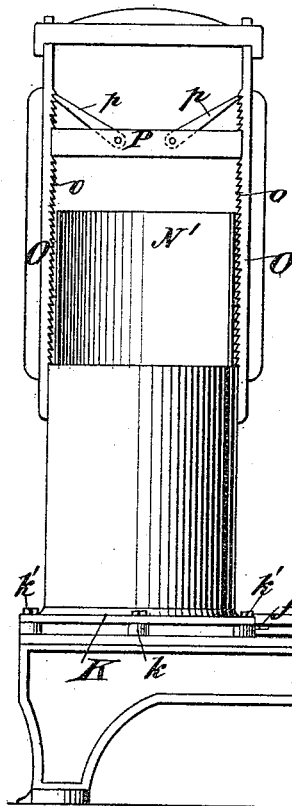
Figure 3:
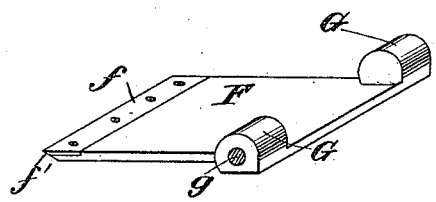
Figure 1:
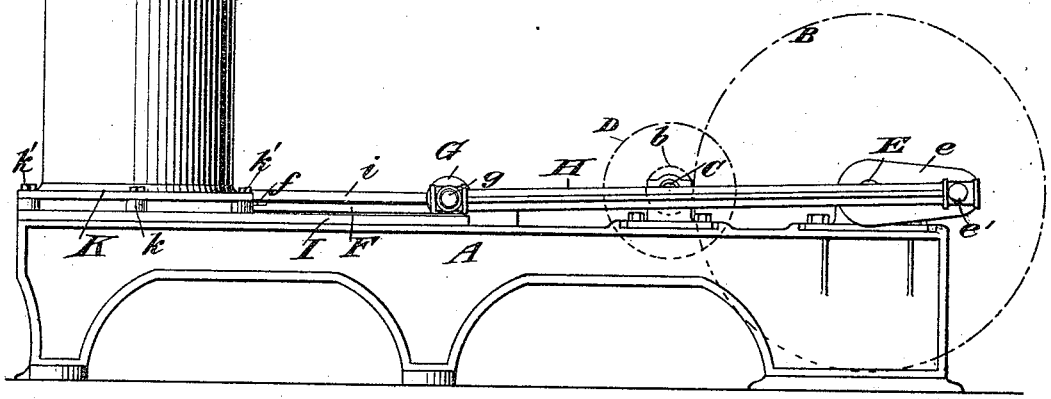
Figure 2:
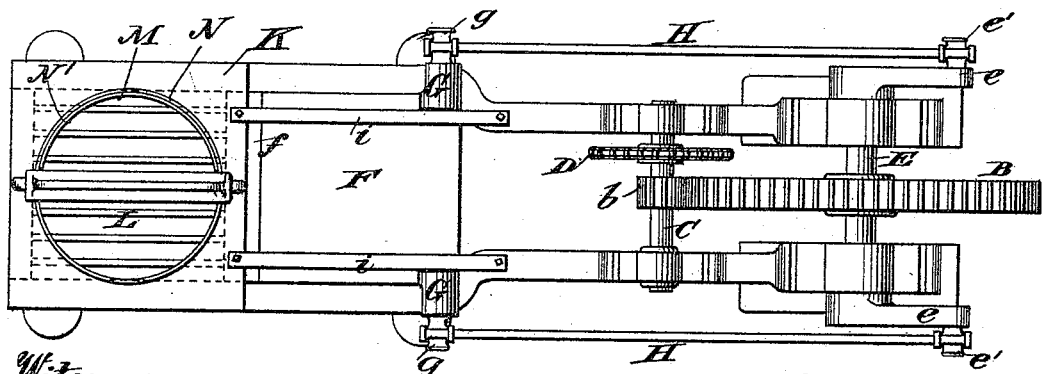

Figure 1 represents the cutter in side elevation. Fig. 2 is a plan view of the same, and Fig. 3 is a view in detail of the sliding knife-support.

A represents the supporting or bed frame, in which is mounted a spur-wheel B, driven by a pinion $b$, mounted upon a shaft C, journaled in suitable bearings in the bed-frame and having secured thereon a sprocket-wheel D, driven by a suitable actuating-power. (Not shown.) The spur-wheel B is fixed upon a shaft E, journaled in suitable bearings in the bed-frame A, and having secured to its opposite ends corresponding cranks $e$. A sliding plate F, forming a support for the cutting-blade $f$ is in the form herein shown provided with a pair of ears G at the opposite corners or its rear end, from which ears connecting pins or studs $g$ extend. The pins or studs $g$ are connected with the wrist-pins $e'$ on the cranks $e$ by means of connecting-rods H, whereby as the wheel B is driven by the pinion $b$ and the shaft E and cranks thereon thereby rotated a forward-and-backward sliding movement is imparted to the plate F and its cutting-blade $f$ on its front edge.

The plate F is supported upon suitable guides I along the opposite sides of the bed-frame A, and is prevented from lifting out of its position by means of suitable upper guides $i$, secured at their rear ends to the bed-frame and to their forward ends to a base-plate K, secured to the bed-frame A at its front end.

The bed-frame A is supplied at its front end beneath the plate K, and on substantially the same plane with or somewhat below the lower face of the plate F, with a skeleton support. (Shown in the present instance as a series of grate-bars L.) The plate K is spaced above the series of grate-bars L, so as to allow the plate F, with its cutting-blade, to slide forward and backward between the two, and has its lower face, preferably, in substantially the same plane as the upper face of the plate F. The plate K is here shown as supported upon short posts $k$, through which fastening-bolts $k'$ extend into the bed-frame.

The base-plate K is provided with a central opening M, in the present instance of about the diameter of one of the barrels which are to be employed to receive the sugar in its liquid state, and around said opening is secured the lower end of an uprising feed-cylinder N. It is intended that the height of the cylinder N shall be equal to or somewhat greater than the height of a barrel employed to receive the liquid sugar, and from the upper end of the feed-cylinder N there projects a semi-cylindrical curb N', the height of which may be equal to or somewhat less than the height of one of the said barrels used. To the diametrically-opposite sides of the feed-cylinder N, standards O are secured, provided on their inner faces with rigid teeth $o$. A follower P, having its opposite ends arranged to partially embrace the opposite sides of the standards O, is allowed a vertically-sliding movement between said standards, and has pivoted thereto a pair of pawls $p$, which as the follower P descends engage the rigid teeth upon the standard O and prevent the said follower from rising, but at all times admit of its falling by its own weight.

The operation is as follows: The barrel containing the hard mass of sugar is unheaded and the hoop or hoops at one end loosened so as to allow the staves to spread sufficiently to permit the mass of sugar to slide out. The said mass is inserted in the feed-cylinder N and descends by its own weight until its lower end rests upon the grate L. The reciprocating cutting-blade $f$ as it advances comes in contact with the lower end of said mass of sugar and severs therefrom a slice the thickness of the distance between the upper face of the grate-bars L and the upper face of the knife-blade. Furthermore, because of the beveled under face $f'$ of the cutting-blade, the slice which is severed will be forced or wedged down through the grate-bars L, and will become thereby effectually crushed or subdivided, and in that condition will fall from the grate-bars into a suitable receptacle. While the cutting of the mass within the feed-cylinder N is going on another similar mass is slid into position with its lower end bearing upon the upper end of the mass already in, the curb N' serving to prevent the displacement of the upper mass of sugar as it is placed in position. The follower P rests upon the upper end of the upper mass of sugar, and with it descends as the lower end is reduced by the cutting-blade and effectually prevents any possibility of the mass being lifted by the action of the knife in case the weight of the mass should not prove sufficient to hold it down.

In practice it is found expedient to arrange a platform (not shown herein) at about the height of the feed-cylinder N for delivering the mass of sugar to the cylinder, or to locate the cutter below the feed-floor of a building in such position that the top of the feed-cylinder N will be substantially upon a level with the feed-floor.

What I claim as my invention is—

1. The combination, with a suitable bed-frame and a skeleton support secured thereon, of a feeding device located above the skeleton support and leaving a free passage for a mass of sugar down through it onto the skeleton support, and a reciprocating cutter having a forward-and-backward movement across the position which the mass of sugar occupies when resting upon the said support, substantially as set forth.

2. In a sugar-cutter, the combination, with a suitable bed-frame and a cutter having a forward-and-backward sliding movement across the frame, of a skeleton support secured in the frame below the path of the reciprocating cutter, and a feeding device secured in position above the said skeleton support and leaving a free passage for the descent of a mass of sugar within the feeding device down onto the skeleton support across the path of the reciprocating cutter, and means for preventing the lifting of the mass of sugar within the feeding device, substantially as set forth.

3. In a sugar-cutter, the combination, with a suitable bed-frame and a reciprocating cutter supported thereon and provided with a blade having a beveled edge, of a skeleton support located below the path in which the cutter reciprocates and a feeding device located above the said skeleton support in position to guide a mass of sugar across the path of the reciprocating cutter, substantially as set forth.

4. In a sugar-cutter, the combination, with a suitable bed-frame and a reciprocating plate provided with a cutter, the said plate and cutter being mounted in the frame, of a shaft provided with a pair of cranks connected with the opposite sides of a sliding plate, gear for rotating the shaft, a skeleton support located below the path of the reciprocating plate and cutter, and a feeding device located above the skeleton support in position to direct a mass of sugar onto the skeleton support across the path of the reciprocating plate and cutter, substantially as set forth.

5. In a sugar-cutter, the combination, with a suitable bed-frame and a reciprocating cutter mounted therein, of a skeleton support located below the path of the reciprocating cutter, a feed-cylinder supported above the said skeleton support, and a feed-curb open at one side and projecting above the upper end of the feed-cylinder for directing a mass of sugar onto the skeleton support across the path of the reciprocating cutter, substantially as set forth.

PAUL H. GRIMM.

Witnesses:
 FREDK. HAYNES,
 K. E. PEMBLETON.